US012812711B2

(12) United States Patent
Takada

(10) Patent No.: US 12,812,711 B2
(45) Date of Patent: Nov. 24, 2026

(54) METHOD AND APPARATUS FOR CONTROLLING EMLMR COMMUNICATION

(71) Applicant: CANON KABUSHIKI KAISHA, Tokyo (JP)

(72) Inventor: Tomoyuki Takada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 291 days.

(21) Appl. No.: 18/621,467

(22) Filed: Mar. 29, 2024

(65) Prior Publication Data

US 2024/0244692 A1 Jul. 18, 2024

Related U.S. Application Data

(63) Continuation of application No. PCT/JP2022/034800, filed on Sep. 16, 2022.

(30) Foreign Application Priority Data

Sep. 30, 2021 (JP) ................................ 2021-162360

(51) Int. Cl.
*H04J 3/00* (2006.01)
*H04W 76/15* (2018.01)

(52) U.S. Cl.
CPC .................................. *H04W 76/15* (2018.02)

(58) Field of Classification Search
CPC ...... H04W 76/15; H04W 48/16; H04W 76/16
See application file for complete search history.

(56) References Cited

U.S. PATENT DOCUMENTS

| | | | | |
|---|---|---|---|---|
| 12,120,763 B2* | 10/2024 | Jang | ...................... | H04W 76/15 |
| 2021/0084711 A1* | 3/2021 | Park | .................. | H04W 72/0453 |
| 2021/0211375 A1* | 7/2021 | Kwon | ................. | H04W 72/535 |
| 2021/0385692 A1* | 12/2021 | Kwon | ................... | H04W 28/24 |
| 2022/0029736 A1* | 1/2022 | Chu | ...................... | H04L 1/0025 |
| 2022/0104261 A1* | 3/2022 | Kwon | ................... | H04W 48/16 |
| 2022/0346171 A1* | 10/2022 | Lu | ......................... | H04L 1/0003 |
| 2023/0139168 A1* | 5/2023 | Xin | .................. | H04W 52/0216 370/311 |
| 2024/0187168 A1* | 6/2024 | Yang | ........................ | H04B 7/04 |
| 2024/0244690 A1* | 7/2024 | Takada | .................. | H04W 88/06 |
| 2024/0267968 A1* | 8/2024 | Takada | .................. | H04W 76/15 |
| 2024/0422852 A1* | 12/2024 | Dong | .................... | H04W 36/06 |

FOREIGN PATENT DOCUMENTS

| | | |
|---|---|---|
| JP | 2018050133 A | 3/2018 |
| WO | 2021090718 A1 | 5/2021 |

* cited by examiner

*Primary Examiner* — Abdelnabi O Musa
(74) *Attorney, Agent, or Firm* — Canon.U.S.A., Inc. IP Division

(57) ABSTRACT

In a case where a communication apparatus exchanges a plurality of starting frames with a partner communication apparatus before starting an enhanced multi-link multi-radio (EMLMR) operation, any one link is enabled to perform the EMLMR operation.

8 Claims, 8 Drawing Sheets

FIG.5B

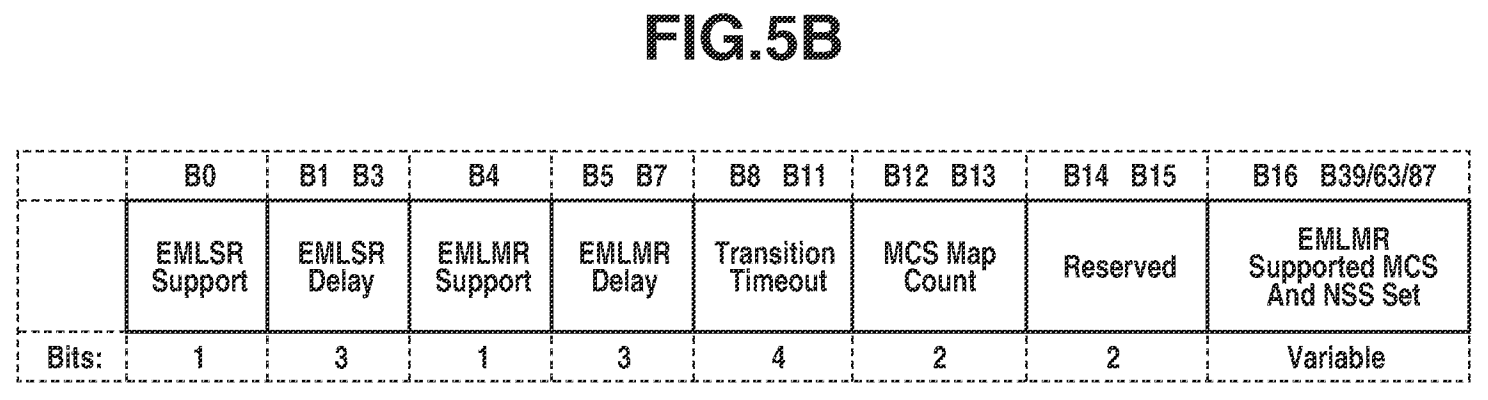

| | B0 | B1 B3 | B4 | B5 B7 | B8 B11 | B12 B13 | B14 B15 | B16 B39/63/87 |
|---|---|---|---|---|---|---|---|---|
| | EMLSR Support | EMLSR Delay | EMLMR Support | EMLMR Delay | Transition Timeout | MCS Map Count | Reserved | EMLMR Supported MCS And NSS Set |
| Bits: | 1 | 3 | 1 | 3 | 4 | 2 | 2 | Variable |

METHOD AND APPARATUS FOR CONTROLLING EMLMR COMMUNICATION

CROSS-REFERENCE TO RELATED APPLICATIONS

This application is a Continuation of International Patent Application No. PCT/JP2022/034800, filed Sep. 16, 2022, which claims the benefit of Japanese Patent Application No. 2021-162360, filed Sep. 30, 2021, both of which are hereby incorporated by reference herein in their entireties.

BACKGROUND OF THE INVENTION

Field of the Invention

The present invention relates to a communication apparatus for performing wireless communication, a method for controlling the communication apparatus, and a storage medium for the communication apparatus.

Background Art

With the increase in the amount of communication data in recent years, communication technologies such as wireless local area networks (LANs) are increasingly being developed. The Institute of Electrical and Electronics Engineers (IEEE) 802.11 standard series is known as a major communication standard for wireless LANs. The IEEE 802.11 standard series includes the IEEE 802.11a/b/g/n/ac/ax standards. For example, IEEE 802.11ax as the latest standard standardizes a technique not only for achieving a throughput as high as 9.6 gigabits/sec. (Gbps) but also for improving the transmission rate under a congested situation by using orthogonal frequency-division multiple access (OFDMA) (see Patent Literature 1). OFDMA is an abbreviation for Orthogonal Frequency-Division Multiple Access.

A task group called IEEE 802.11be has been established as a successor standard aiming for further improvements of the throughput, frequency usage efficiency, and communication latency.

For the IEEE 802.11be standard, Multi-Link communication is currently being studied, in which one access point (AP) and one station (STA) build a plurality of links in the 2.4 GHz, 5 GHZ, and 6 GHz frequency bands to perform simultaneous communication. An AP in Multi-Link communication is referred to as an access point multi-link device (AP MLD), and an STA is referred to as a non-access point multi-link device (non-AP MLD).

For the IEEE 802.11be standard, an enhanced multi-link multi-radio (EMLMR) operation in Multi-Link communication is currently being studied. The non-AP MLD operating in the EMLMR mode performs an initial frame exchange based on the number of spatial streams according to per-link spatial stream capability for each EMLMR link, and then performs operations (described below) till the end of a frame exchange sequence via the link that has performed the initial frame exchange. In the operations, the non-AP MLD receives a physical layer convergence protocol data unit (PPDU) based on the number of spatial streams of which the maximum value is presented in an EMLMR SUPPORTED MCS AND NSS SET sub field of a Common Info field of a Basic variant Multi-Link element, and then transmits the PPDU based on the number of spatial streams presented in the EMLMR SUPPORTED MCS AND NSS SET sub field.

CITATION LIST

Patent Literature

PTL 1: Japanese Patent Application Laid-Open No. 2018-50133

SUMMARY OF THE INVENTION

Various embodiments of the present disclosure provide for detecting, during the time period since the start of an initial frame exchange till the first frame transmission via a specific enhanced multi-link multi-radio (EMLMR) link (i.e., the time period since the transmission of a starting frame to start the frame exchange sequence till the start of an EMLMR operation following the reception of a response frame), reception of a second starting frame via a second EMLMR link. In a case where a communication apparatus exchanges a plurality of starting frames with a partner communication apparatus during such time period in this manner, the communication apparatus needs to suitably control operations in the EMLMR mode.

Accordingly, various embodiments provide features for suitably controlling operations in the EMLMR mode in a case where the communication apparatus exchanges a plurality of starting frames with the partner communication apparatus during the time period.

According to one embodiment of the present disclosure, a communication apparatus operating as a Multi-Link Device conforming to an Institute of Electrical and Electronics Engineers (IEEE) 802.11 series standard, the communication apparatus includes a detection unit configured to, during a time period since transmission of a first starting frame to start a frame exchange sequence via a first enhanced multi-link multi-radio (EMLMR) link to another communication apparatus till start of a next frame transmission upon reception of a response frame to the first starting frame, detect reception of a second starting frame to start a frame exchange sequence via a second EMLMR link different from the first EMLMR link from the another communication apparatus, and a control unit configured to, in a case where the detection unit detects the reception of the second starting frame during the time period, perform control to continue the frame exchange sequence via the first EMLMR link or the second EMLMR link.

Further features of the present disclosure will become apparent from the following description of exemplary embodiments with reference to the attached drawings.

BRIEF DESCRIPTION OF THE DRAWINGS

FIG. 5B illustrates an enhanced multi-link multi-radio (EMLMR) Capabilities sub field included in a Common Info field of a Basic variant Multi-Link element.

DESCRIPTION OF THE EMBODIMENTS

Exemplary embodiment of the present invention will be described in detail below with reference to the accompanying drawings. Configurations described in the following exemplary embodiments are to be considered as illustrative, and the present invention is not limited to the illustrated configurations.

(Configuration of Wireless Communication System)

Figure 1:
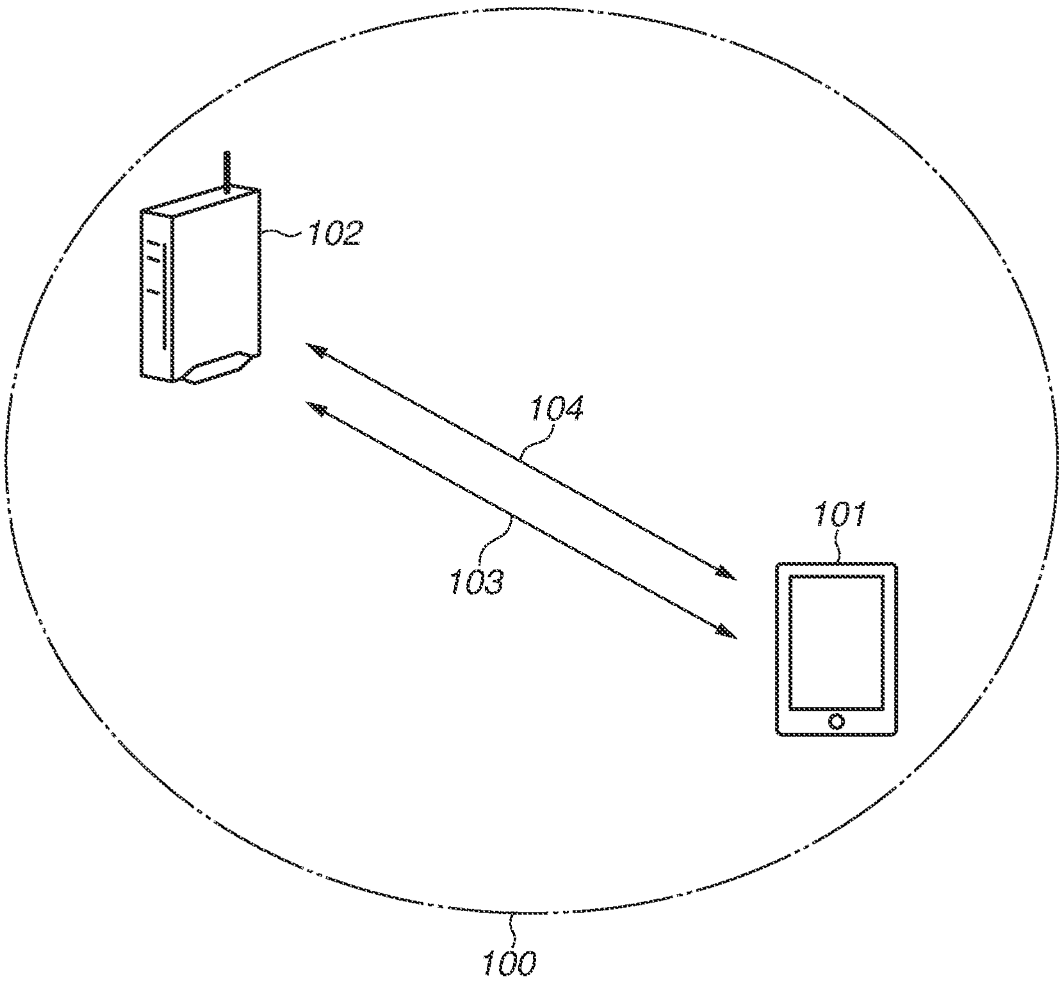
FIG. 1 illustrates a configuration of a network according to the present invention.

FIG. 1 illustrates a configuration of a network to be searched by a communication apparatus 101 (hereinafter referred to as a Non-AP MLD 101) according to the present exemplary embodiment. A communication apparatus 102 (hereinafter referred to as an AP MLD 102) is an access point (AP) having a role of building a wireless network 100. The AP MLD 102 can communicate with the Non-AP MLD 101. The present exemplary embodiment applies to the Non-AP MLD 101 and the AP MLD 102.

Each of the Non-AP MLD 101 and the AP MLD 102 can perform wireless communication conforming to the IEEE 802.11be (Extremely High Throughput (EHT) standard. IEEE is an abbreviation for Institute of Electrical and Electronic Engineers. The Non-AP MLD 101 and the AP MLD 102 can communicate with each other by using frequencies in the 2.4 GHz, 5 GHZ, and 6 GHz frequency bands. Frequency bands used by these communication apparatuses are not limited thereto. Each communication apparatus may use a different frequency band such as the 60 GHz frequency band. The Non-AP MLD 101 and the AP MLD 102 can communicate with each other by using the 20 MHz, 40 MHZ, 80 MHz, 160 MHz, and 320 MHz bandwidths. Bandwidths used by these communication apparatuses are not limited thereto. Each communication apparatus may use different bandwidths such as the 240 MHz and 4 MHz bandwidths.

The Non-AP MLD 101 and the AP MLD 102 can implement multi user (MU) communication which multiplexes signals of a plurality of users by performing OFDMA communication conforming to the IEEE 802.11be standard. OFDMA is an abbreviation for Orthogonal Frequency Division Multiple Access. In OFDMA communication, parts (resource units (RUS)) of a divided frequency band are allocated to STAs without overlapping each other, and the carriers of these STAs are orthogonal to each other. This enables the AP to communicate with a plurality of STAs in parallel in the set band width.

Generally, electric waves having different frequencies reach different distances. It is known that an electric wave having a lower frequency provides a larger diffraction and reaches a longer distance, and that an electric wave having a higher frequency provides a smaller diffraction and reaches a shorter distance. Even if there is an obstacle on the way, an electric wave having a low frequency reaches due to diffraction relative to the obstacle, while an electric wave having a high frequency has a high rectilinear property and is less likely to diffract relative to the obstacle so that there is a case where the electric wave having a high frequency does not reach. Meanwhile, the 2.4 GHz frequency is often used by other apparatuses. A micro wave oven is known to generate an electric wave in the same frequency band. An electric wave generated by the same apparatus has a different intensity and a different SN (signal-to-noise) ratio for each frequency band depending on the location and environment where the apparatus is installed.

While the Non-AP MLD 101 and the AP MLD 102 conform to the IEEE 802.11be standard, the Non-AP MLD 101 and the AP MLD 102 may conform to a legacy standard that is earlier than the IEEE 802.11be standard in addition to the IEEE 802.11be standard. More specifically, the Non-AP MLD 101 and the AP MLD 102 may conform to at least one of IEEE 802.11a/b/g/n/ac/ax standards. Each communication apparatus may conform to other communication specifications such as Bluetooth®, near field communication (NFC), ultra wide band (UWB), ZigBee, and multi band OFDM alliance (MBOA) in addition to the IEEE 802.11 series standards. UWB is an abbreviation for Ultra Wide Band, and MBOA is an abbreviation for Multi Band OFDM Alliance.

NFC is an abbreviation for Near Field Communication. UWB includes Wireless Universal Serial Bus (USB), Wireless 1394, and WiNET. Each communication apparatus may conform to wired communication specifications such as a wired LAN. Specific examples of the AP MLD 102 include a wireless LAN router and a personal computer (PC), and the present invention is not limited thereto. The AP MLD 102 may be an information processing apparatus such as a wireless chip capable of performing wireless communication conforming to the IEEE 802.11be standard.

Specific examples of the Non-AP MLD 101 include cameras, tablet computers, smart phones, PCs, mobile phones, video cameras, and head sets, and the present invention is not limited thereto. The Non-AP MLD 101 may be an information processing apparatus such as a wireless chip capable of performing wireless communication conforming to the IEEE 802.11be standard. Each communication apparatus can communicate by using the 20 MHz, 40 MHz, 80 MHz, 160 MHz, and 320 MHz bandwidths.

The Non-AP MLD 101 and the AP MLD 102 establish links via a plurality of frequency channels and perform Multi-Link communication. The IEEE 802.11 series standard defines the band width of each frequency channel as 20 MHz for other than the 60 GHz band, and as 2.16 GHz for the 60 GHz band. The frequency channels refer to frequency channels defined in the IEEE 802.11 series standard. The IEEE 802.11 series standard defines a plurality of frequency channels in each of the 2.4 GHz, 5 GHZ, 6 GHz, and 60 GHz frequency bands. The 40 MHz or higher bandwidth may be used in one frequency channel through bonding with the adjacent frequency channel.

For example, the AP MLD 102 is capable of establishing a link to communicate with the Non-AP MLD 101 via the first frequency channel of the 2.4 GHz band. In parallel with this communication, the Non-AP MLD 101 is capable of establishing a link to communicate with AP MLD 102 via the second frequency channel of the 5 GHz band. In this case, the Non-AP MLD 101 performs Multi-Link communication to maintain the second link via the second frequency channel in parallel with the link via the first frequency channel. The AP MLD 102 establishes links with the Non-AP MLD 101 via a plurality of frequency channels in this way, making it possible to improve the throughput in communication with the Non-AP MLD 101.

For links between the communication apparatuses, a plurality of links using different frequency bands may be established in Multi-link communication. For example, the Non-AP MLD 101 may establish a link in each of the 2.4 GHz, 5 GHZ, and 6 GHz bands. Alternatively, the Non-AP MLD 101 may establish links via a plurality of different frequency channels included in the same frequency band.

For example, the 6-channel link in the 2.4 GHz band may be established as the first link, and the 1-channel link in the 2.4 GHz band may be established as the second link. Links having the same frequency band or different frequency bands may be established at the same time. For example, the Non-AP MLD 101 may be able to establish a 1-channel link in the 2.4 GHz band and a 149-channel link in the 5 GHz band in addition to the 6-channel first link in the 2.4 GHz band. The Non-AP MLD 101 and the AP establish a plurality of connections using different frequencies, and whereby communication with the Non-AP MLD 101 can be established in another band even in a case where a certain band is congested. This enables preventing throughput degradation and communication delay in communication with the Non-AP MLD 101.

Although the wireless network in FIG. 1 includes one AP MLD and one Non-AP MLD, the numbers and configurations of AP MLDs and Non-AP MLDs are not limited thereto. For example, one Non-AP MLD may be added to the wireless network in FIG. 1. In this case, the frequency band of each link to be established, the number of links, and the frequency band are not cared.

When performing Multi-link communication, the AP MLD 102 and the Non-AP MLD 101 communicate data with the partner communication apparatus via a plurality of links. Data communication may be performed via one of the links configuring Multi-link communication.

The AP MLD 102 and the Non-AP MLD 101 may be able to perform Multiple-Input And Multiple-Output (MIMO) communication. In this case, the AP MLD 102 and the Non-AP MLD 101 have a plurality of antennas, and one apparatus transmits different signals from respective antennas by using the same frequency channel. The reception side simultaneously receives all signals that arrived from a plurality of streams through a plurality of antennas, and separates and decodes the signal of each stream. By performing MIMO communication in this way, the AP MLD 102 and the Non-AP MLD 101 can communicate a larger amount of data in the same time period than in a case where MIMO communication is not performed. When performing Multi-link communication, the AP MLD 102 and the Non-AP MLD 101 may perform MIMO communication in some of links.

(Configurations of AP MLD and Non-AP MLD)

Figure 2:
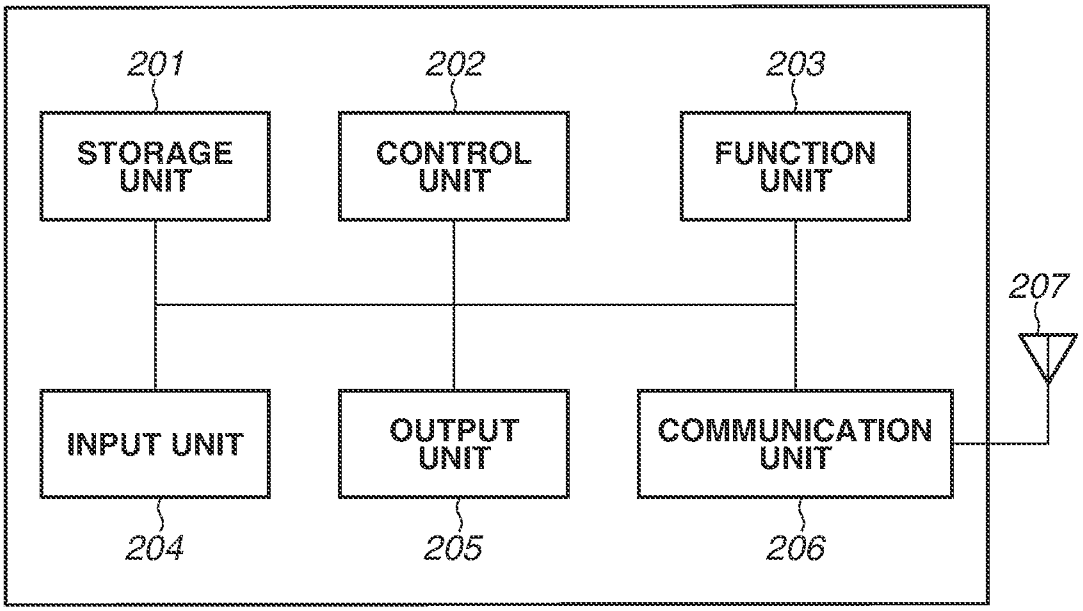
FIG. 2 illustrates a hardware configuration of a communication apparatus according to the present invention.

FIG. 2 illustrates an example of a hardware configuration of the Non-AP MLD 101 according to the present exemplary embodiment. The Non-AP MLD 101 includes a storage unit 201, a control unit 202, a function unit 203, an input unit 204, an output unit 205, a communication unit 206, and an antenna 207. The Non-AP MLD 101 may include a plurality of antennas.

The storage unit 201 including one or more memories such as a read only memory (ROM) and a random access memory (RAM) stores computer programs for performing various operations to be described below and stores various kinds of information such as communication parameters for wireless communication. ROM is an abbreviation for Read Only Memory, and RAM is an abbreviation for Random Access Memory. Storage media applicable as the storage unit 201 include not only the ROM and RAM but also a flexible disk, hard disk, optical disk, magneto-optical disk, compact disc read only memory (CD-ROM), compact disc recordable (CD-R), magnetic tape, nonvolatile memory card, and digital versatile disc (DVD). The storage unit 201 may also include a plurality of different memories.

The control unit 202 includes one or more processors such as a central processing unit (CPU) and a micro processing unit (MPU), and totally controls the Non-AP MLD 101 by executing computer programs stored in the storage unit 201. The control unit 202 may totally control the Non-AP MLD 101 through the collaboration between the computer programs stored in the storage unit 201 and an operating system (OS). The control unit 202 also generates data and signals (wireless frames) to be transmitted in communication with another communication apparatus. CPU is an abbreviation for Central Processing Unit, and MPU is an abbreviation for Micro Processing Unit. The control unit 202 may also include a plurality of processors such as multi-core processors and control the entire Non-AP MLD 101 by using the plurality of processors.

The control unit 202 controls the function unit 203 to perform predetermined processing such as wireless communication, imaging, printing, and projection. The function unit 203 is a hardware component required for the Non-AP MLD 101 to perform predetermined processing.

The input unit 204 receives various operations from the user. The output unit 205 outputs various types of information to the user via a monitor screen and a speaker. Information output by the output unit 205 may include display on the monitor screen, an audio output to the speaker, and a vibratory output. The input unit 204 and the output unit 205 may be implemented as a single module like a touch panel. Each of the input unit 204 and the output unit 205 may also be integrated with the Non-AP MLD 101 or separated therefrom.

The communication unit 206 controls wireless communication conforming to the IEEE 802.11be standard. The communication unit 206 may also control wireless communication conforming to other IEEE 802.11 series standards in addition to the IEEE 802.11be standard, and control wired communication using a wired LAN or the like. The communication unit 206 controls the antenna 207 to communicate wireless communication signals generated by the control unit 202.

When the Non-AP MLD 101 conforms to the NFC or Bluetooth standard in addition to the IEEE 802.11be standard, the communication unit 206 may control wireless communication conforming to these communication standards. In a case where the Non-AP MLD 101 can perform wireless communication conforming to a plurality of communication standards, the Non-AP MLD 101 may include different communication units and different antennas conforming to these communication standards. The Non-AP MLD 101 communicates image data, document data, and video data with the AP MLD 102 via the communication unit 206. The antenna 207 may be configured as a separate unit of the communication unit 206 or integrated with the communication unit 206 as one module.

The antenna 207 is capable of performing communication in the 2.4 GHz, 5 GHz, and 6 GHz bands. Although, in the present exemplary embodiment, the Non-AP MLD 101 has one antenna, the Non-AP MLD 101 may have three different antennas. Alternatively, the Non-AP MLD 101 may have a different antenna for each frequency band. In a case where the Non-AP MLD 101 has a plurality of antennas, the Non-AP MLD 101 may include the communication unit 206 supporting each antenna.

The AP MLD 102 has a hardware configuration similar to that of the Non-AP MLD 101.

Figure 3:
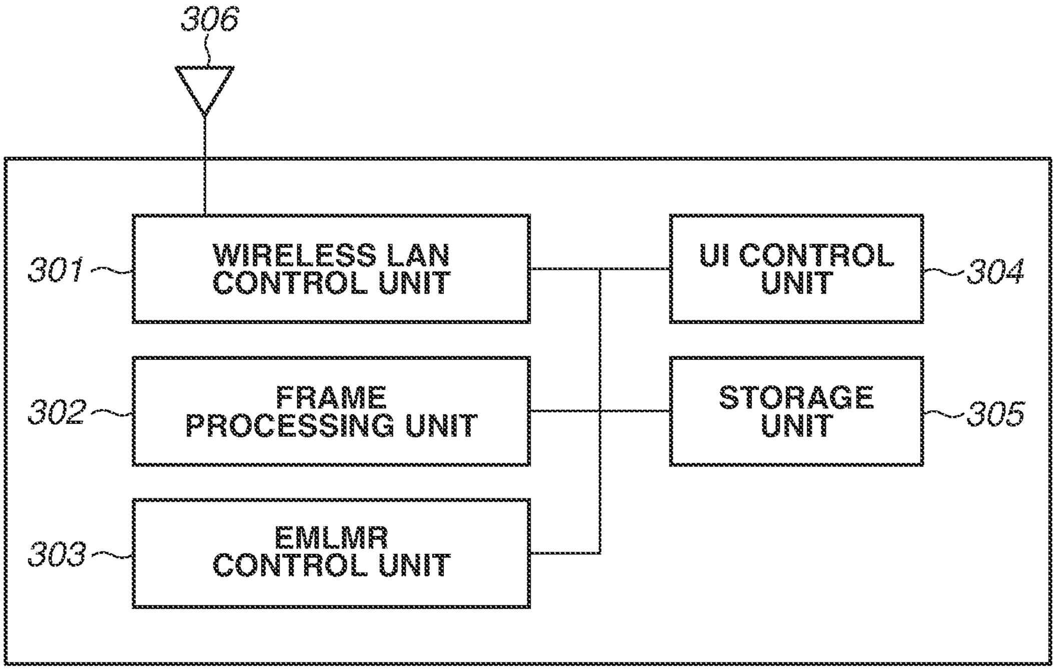
FIG. 3 illustrates a functional configuration of the communication apparatus according to the present invention.

FIG. 3 is a block diagram illustrating a functional configuration of the Non-AP MLD 101 according to the present exemplary embodiment. The AP MLD 102 has a similar functional configuration. The Non-AP MLD 101 includes a wireless LAN control unit 301. The number of wireless LAN control units is not limited to one but may be two or more than two. The Non-AP MLD 101 further includes a frame processing unit 302, an enhanced multi-link multi-radio (EMLMR) control unit 303, a User Interface (UI) control unit 304, a storage unit 305, and a wireless antenna 306.

The wireless LAN control unit 301 includes an antenna and a circuit for communicating wireless signals with another wireless LAN apparatus, and programs for controlling the antenna and the circuit. The wireless LAN control unit 301 controls wireless LAN communication based on frames generated by the frame processing unit 302 according to the IEEE 802.11 standard series.

The frame processing unit 302 processes wireless control frames communicated by the wireless LAN control unit 301. The contents of wireless control generated and analyzed by the frame processing unit 302 may be restricted based on settings stored in the storage unit 305 or changed by user settings from the UI control unit 304. Generated frame information is transmitted to the wireless LAN control unit 301 and then transmitted to the partner communication apparatus. The frame information received by the wireless LAN control unit 301 is transferred to the frame processing unit 302 and then analyzed.

The EMLMR control unit 303 performs management control to determine which link is to be used as the EMLMR link. The management control includes the establishment and deletion of the EMLMR links.

The establishment of an EMLMR link refers to a state where the EMLMR link is identified when or after Multi-Link communication is established. The deletion of an EMLMR link refers to canceling the state where the EMLMR link is identified.

The UI control unit 304 includes hardware components related to user interfaces such as a touch panel and buttons (not illustrated) for receiving operations on the Non-AP MLD 101 performed by the user of the Non-AP MLD 101, and programs for controlling these hardware components. The UI control unit 304 also has a function of displaying images or a function of presenting audio output information to the user.

The storage unit 305 is a storage device that may include the ROM and the RAM for storing programs and data on which the Non-AP MLD 101 operates.

Figure 4:
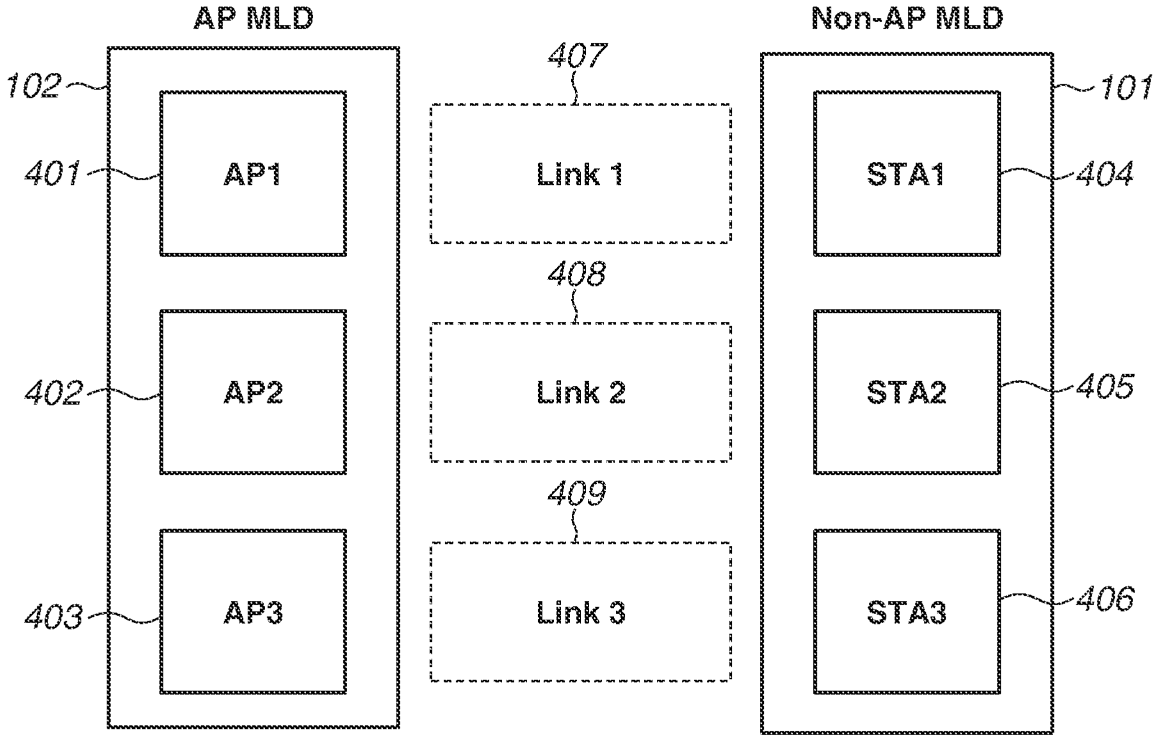
FIG. 4 illustrates an overview of Multi-Link communication.

FIG. 4 illustrates a configuration including the AP MLD and the Non-AP MLD performing Multi-Link communication.

A communication apparatus operating in Multi-Link communication is referred to as a Multi-Link device (MLD). One MLD includes a plurality of STAs and access points (APs) associated with each link. An MLD having the AP function is referred to as an AP MLD, and an MLD not having the AP function is referred to as a Non-AP MLD.

Referring to FIG. 4, an AP1 401 and an STA1 404 establish a Link1 407 via the first frequency channel. Likewise, an AP2 402 and an STA2 405 establish a Link2 408 via the second frequency channel, and an AP3 403 and an STA3 406 establish a Link3 409 via a third frequency channel.

The AP MLD and the Non-AP MLD establish a connection via frequency channels in the sub GHz, 2.4 GHZ, 3.6 GHz, 4.9 GHz, 5 GHz, 60 GHz, and 6 GHz bands. The AP MLD and the Non-AP MLD maintain the second link connection via the second frequency channel in parallel with the first link connection via the first frequency channel. These MLDs may establish a plurality of connections via different frequency channels in the same frequency band, not connections in different frequency bands.

Each of Link1, Link2, and Link3 is assigned the number of spatial streams according to the per-link spatial stream capability. If six different antennas are assumed to exist, each link will use two antennas. More specifically, the spatial stream capability for each link is "2". In a case where Link1, Link2, and/or Link3 are the EMLMR link(s), which is described below, the spatial stream capability during an EMLMR operation in Link1 is "4" or "6", and the spatial stream capability in Link2 and/or Link3 is "0". This means that the use of a plurality of antennas makes it possible to communicate, via Link1, division pieces of data or a plurality of different pieces of data at the same timing and at the same frequency by using a plurality of antennas so as to avoid spatial interference. The number of spatial streams is determined by an EHT Capabilities element or an EHT Operation element included in the frame declaring that the non-AP MLD conforms to EHT. More specifically, the number of spatial streams is determined by the value of a Supported EHT-MCS And NSS Set field or a Basic EHT-MCS And NSS Set field included in the EHT Capabilities element or the EHT Operation element.

Figure 5A:
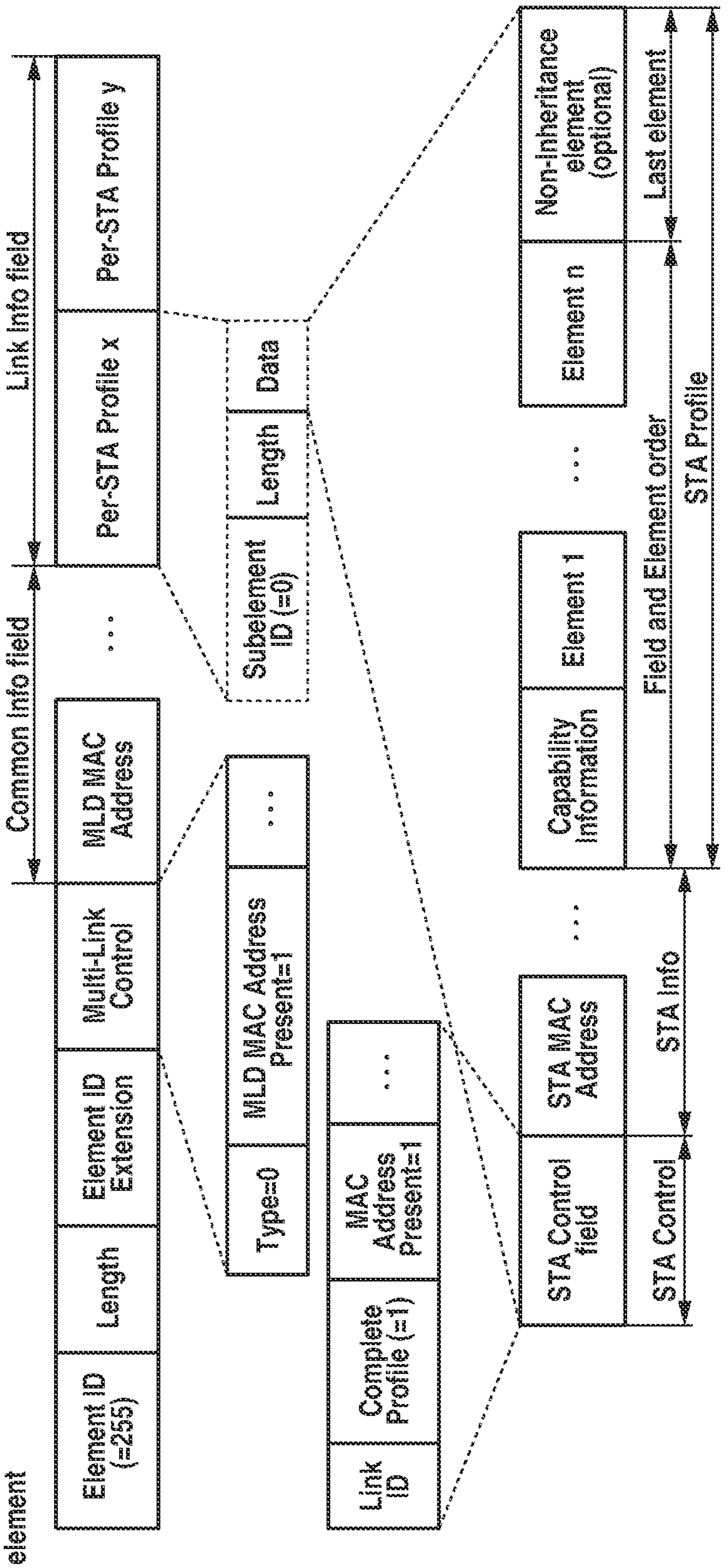
FIG. 5A illustrates a Basic variant Multi-Link element included in an Association Request frame.

FIG. 5A illustrates a Basic variant Multi-Link element in an Association Request frame. FIG. 5B illustrates an EMLMR Capabilities sub field included in a Common Info field of the Basic variant Multi-Link element. The EMLMR Support field "O" indicates that EMLMR is not supported, and the EMLMR Support field "1" indicates that EMLMR is supported. When Multi-Link communication is established, all links establish an EMLMR link. Although the Basic variant Multi-Link element is described to be included in the Association Request frame when Multi-Link communication is established, the element may be included in a probe request frame, probe response frame, association response frame, or Beacon frame.

An EMLMR link is established when a frame including the EMLMR Support sub field having a value of 1 is transmitted, received, or exchanged in each link configuring the Multi-Link. In this case, when the operation is performed by some of the links configuring the Multi-Link, the EMLMR link may be established only in these links. The EMLMR link may also be established via a plurality of links including other links when the frame including the EMLMR Support sub field having a value of 1 is transmitted, received, or exchanged in one link. In this case, the EMLMR link may be established via all of the links configuring the Multi-Link or established by some of the links. The control unit 202 may specify links for establishing an EMLMR link, by including information for identifying links for establishing an EMLMR link in the frame including the EMLMR Support sub field having a value of 1. Information usable for identifying a link includes a link identifier (ID), and a basic service set identifier (BSSID) and a traffic identifier (TID) corresponding to the link.

The EMLMR Supported MCS And NSS Set sub field refers to the maximum number of spatial streams when PPDU is communicated during the EMLMR operation. When a specific link performs the EMLMR operation, the numbers of spatial streams assigned to links other than the link performing the EMLMR operation decreases, which enables the specific link to communicate PPDU with the increased number of spatial streams.

Although the control unit 202 issues an instruction to establish an EMLMR link when establishing Multi-Link communication, the control unit 202 may specify the link establishment by using the Action frame transmitted after establishing Multi-Link communication. In this case, the control unit 202 may issue an instruction to establish an EMLMR link, by preparing a frame called the EML (Enhanced Multi-Link) Operating Mode Notification frame. For example, when the Non-AP MLD receives the frame including the EMLMR Support sub field having a value of 1 and transmits the EML Operating Mode Notification frame including the EMLMR Mode sub field having a value of 1, the links that communicated these frames establish an EMLMR link. Alternatively, some of other links or all of the links configuring the Multi-link may establish an EMLMR link. When the AP MLD transmits the frame including the EMLMR Support sub field having a value of 1 and receives the EML Operating Mode Notification frame including the EMLMR Mode sub field having a value of 1, the links that communicated these frames establish an EMLMR link. Alternatively, some of other links or all of the links configuring the Multi-link may establish an EMLMR link. In this case, the control unit 202 may specify the links for establishing an EMLMR link, by including the information for identifying the links for establishing an EMLMR link in the EML Operating Mode Notification frame. Information usable to identify a link includes a link identifier (ID), and a basic service set identifier (BSSID) and a traffic identifier (TID) corresponding to the link.

Although the Non-AP MLD has been described to establish an EMLMR link, the AP MLD may issue an instruction to establish an EMLMR link. The EML Operating Mode Notification frame is the Action frame transmitted to enable the non-AP MLD to operate in the EMLMR mode. This frame needs to be transmitted for the EMLMR mode operation if no EMLMR link is established upon establishment of Multi-Link communication or after an EMLMR link is established and then deleted.

Figure 6A:
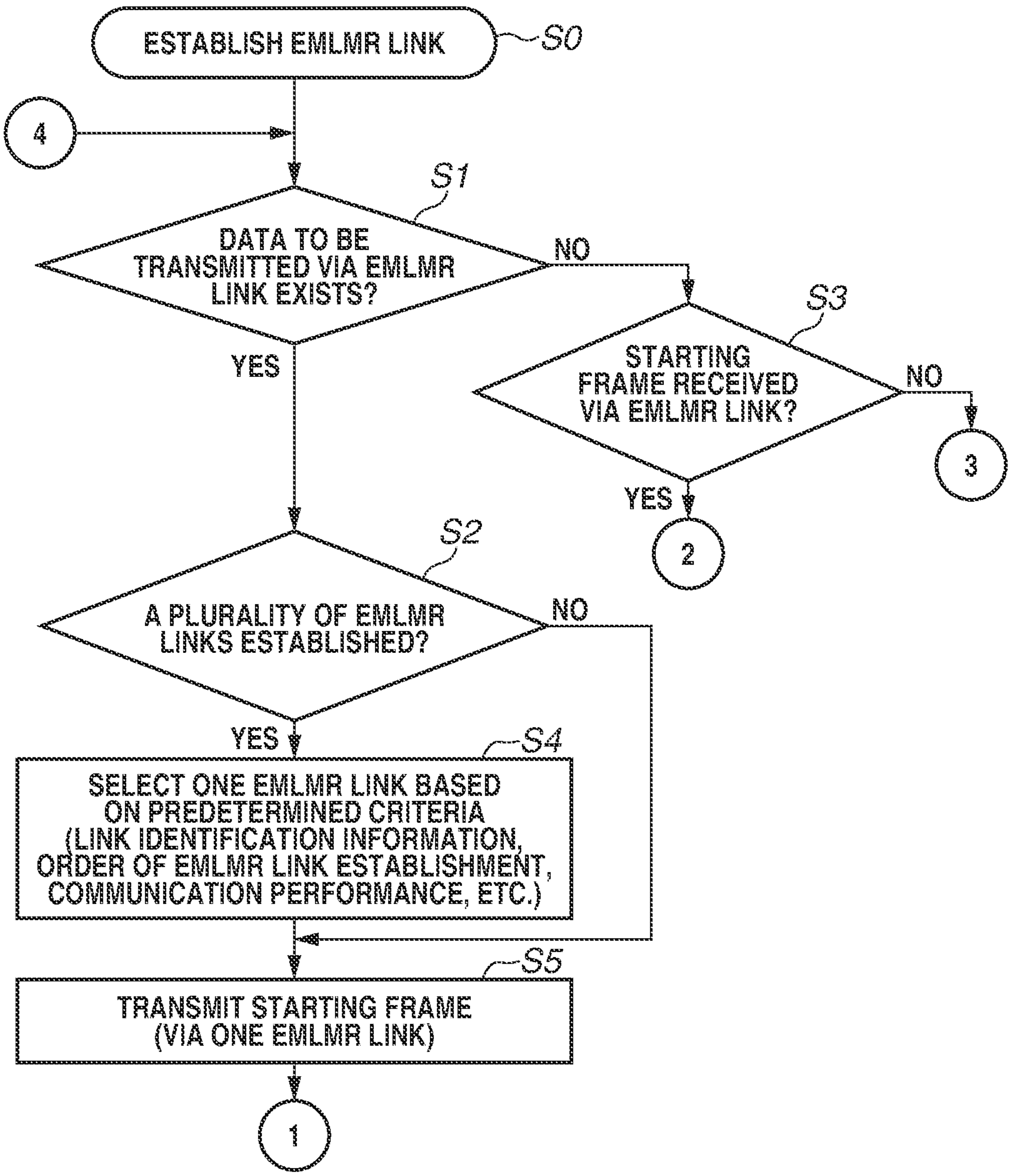
FIG. 6A is a flowchart illustrating processing to be performed to start a frame exchange sequence in an EMLMR link according to the present invention.
Figure 6B:
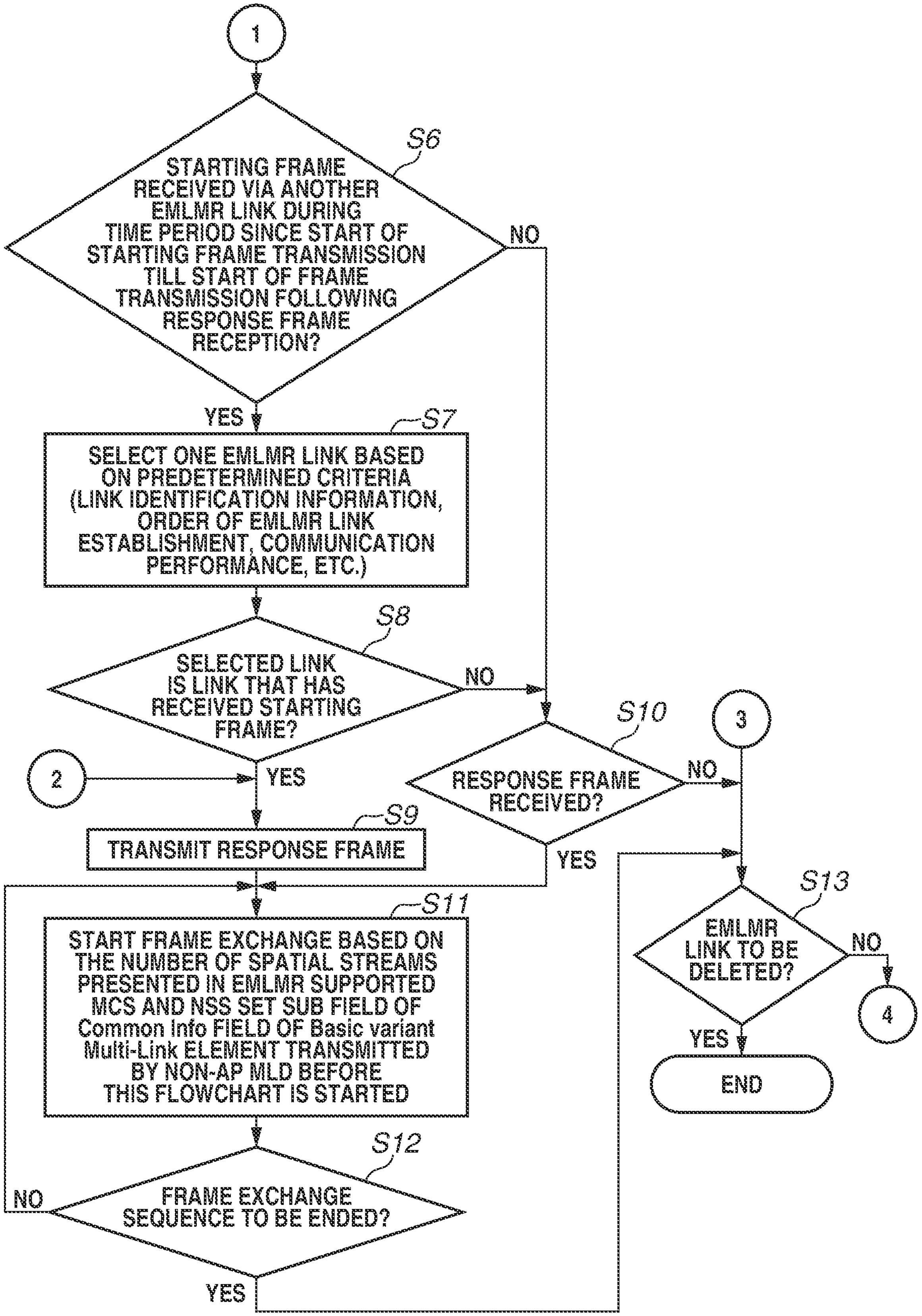
FIG. 6B is a flowchart illustrating processing to be performed to start a frame exchange sequence in an EMLMR link according to the present invention.

Operations when the Non-AP MLD 101 and/or the AP MLD 102 establish an EMLMR link and then operate in the EMLMR mode to perform frame exchange will be described below with reference to FIGS. 6A and 6B. A frame exchange sequence starts at the time of the starting frame transmission. Therefore, the present invention represents that the EMLMR link performing the EMLMR operation continues the frame exchange sequence. The entity of the following operations refers to the operation of the frame processing unit 302 or the EMLMR control unit 303. However, the operation as a communication apparatus refers to the operation of at least either one of the communication apparatuses (the Non-AP MLD 101 and the AP MLD 102). Thus, the following descriptions will be made on the premise that the entity of the operation is the control unit 202 of a communication apparatus.

In step S0, the control unit 202 establishes an EMLMR link. As described above, an EMMLMR link is established with one of the following methods. At this timing, the EMLMR operation is not performed via any link. In step S1, the control unit 202 determines whether there exists data to be transmitted to the partner communication apparatus. Examples of the data to be transmitted include data subjected to a transmission request from any communication apparatus to the partner communication apparatus and data generated by the function unit 203.

When the result of the determination in step S1 is YES, the processing proceeds to step S2. When the result of the determination in step S1 is NO, the processing proceeds to step S3. In step S3, the control unit 202 determines whether the starting frame is received from the partner communication apparatus via the EMLMR link. When the result of the determination in step S3 is YES, the processing proceeds to step S9. When the result of the determination in step S3 is NO, the processing proceeds to step S13. The starting frame of the EMLMR link is the frame transmitted first in the frame exchange sequence as defined in the IEEE 802.11 standard Annex G. Examples of such frames include the Request To Send (RTS) frame and the MU-RTS Trigger frame. This starting frame serves as an instruction to start the frame exchange via the EMLMR link after an EMLMR link is established.

In step S13, the control unit 202 determines whether to delete the EMLMR link. When the EMLMR link is to be deleted, the control unit 202 ends this processing. When the EMMLMR link is not to be deleted, the processing returns to step S1. Therefore, the processing in FIGS. 6A and 6B continues while an EMLMR link is established and ends when the EMLMR link is deleted. Methods for deleting the EMLMR link include a method for deleting the EMLMR link on condition that the communication apparatus does not perform data communication via the EMLMR link for a predetermined time period, and a method for deleting the EMLMR link upon reception of a frame including an EMLMR link deletion request from the partner communication apparatus. Examples of frames including the EMLMR link deletion request include the EML Operating Mode Notification frame including the EMLMR Mode sub field having a value of 0, and a frame including the EMLMR Support sub field having a value of 0.

The deletion of the EMLMR link is performed when these frames are transmitted, received, or exchanged in each EMLMR link. In this case, when the operation is performed in some of the links configuring the EMLMR links, some of the EMLMR links may be deleted. All of the EMLMR links may be deleted when the operation is performed in all links. A plurality of the EMLMR links including other EMLMR links may be deleted when the frame including the EMLMR link deletion request is transmitted, received, or exchanged in one link. In this case, all of the EMLMR links or some of the EMLMR links may be deleted. In this case, the control unit 202 may specify the EMLMR links to be deleted, by including information for identifying the EMLMR links to be deleted in the frame including the EMLMR link deletion request. Information usable to identify a link includes a link identifier (ID), and a basic service set identifier (BSSID) and a traffic identifier (TID) corresponding to the link.

In step S2, the control unit 202 determines whether a plurality of the EMLMR links is established. For example, when not only Link1 but also Link2 is established, the result of the determination is YES. When only Link1 is established, the result of the determination is NO. Possible methods for confirming whether a plurality of the EMLMR links is established include a method for determining whether each of the plurality of the links transmits or receives the frame including the EMLMR Support sub field having a value of 1. The non-AP MLD possibly uses a method for determining whether each of the plurality of the links receives the frame including the EMLMR Support sub field having a value of 1 and transmits the EML Operating Mode Notification frame including the EMLMR Mode sub field having a value of 1. The AP MLD possibly uses a method for determining whether each of the plurality of the links transmits the frame including the EMLMR Support sub field having a value of 1 and receives the EML Operating Mode Notification frame including the EMLMR Mode sub field having a value of 1. Alternatively, the control unit 202 may confirm whether a plurality of the EMLMR links is established, by performing the above-described determination in any of the links configuring the Multi-link, not in each of the plurality of the links.

When the result of the determination in step S2 is NO, the control unit 202 transmits the starting frame to the partner communication apparatus via a specific link as an EMLMR link. When the result of the determination in step S2 is YES, the control unit 202 selects one EMLMR link from among the plurality of the EMLMR links based on predetermined criteria.

Methods for determining an EMLMR link based on the predetermined criteria will be described below. There are three different methods: (1) selecting a link based on information (link ID) for link identification, (2) selecting a link based on the order of the EMLMR link establishment, and (3) selecting a link based on a communication performance (congestion level of channel corresponding to the links, i.e., the number of STAs connected to the AP). One EMLMR link is selected based on at least one.

When selecting a link based on information (link ID) for link identification, the control unit 202 refers to the Link ID sub field of the Multi-Link element in FIG. 5A to determine a link. Link ID is an identifier (ID) to be assigned to each link when Multi-Link communication is established. When an ID is assigned in order of the link ID establishment, a link having a small link ID number out of the plurality of the EMLMR links is one of the EMLMR links to be selected. Alternatively, a link having a large link ID number may be one of the EMLMR links to be selected.

When selecting a link based on the order of the EMLMR link establishment, the control unit 202 selects a link based on at least one of the following orders:

- The order of transmission of the frame including the EMLMR Support sub field having a value of 1
- The order of reception of the frame including the EMLMR Support sub field having a value of 1
- The order of transmission and reception of the frame including the EMLMR Support sub field having a value of 1
- The order of transmission of the EML Operating Mode Notification frame including the EMLMR Mode sub field having a value of 1 (in case of the non-AP MLD)
- The order of reception of the EML Operating Mode Notification frame including the EMLMR Mode sub field having a value of 1 (in case of the AP MLD)
- The order of reception of the frame including the EMLMR Support sub field having a value of 1 and transmission of the EML Operating Mode Notification frame including the EMLMR Mode sub field having a value of 1 (in case of the non-AP MLD)
- The order of transmission of the frame including the EMLMR Support sub field having a value of 1 and reception of the EML Operating Mode Notification frame including the EMLMR Mode sub field having a value of 1 (in case of the AP MLD).

In a case where the above-described frame includes the information for identifying links for establishing an EMLMR link, based on the order of transmission or reception of the information, the control unit 202 may select the EMLMR link identified by the information. Based on the order in which the transmitted information for identifying links for establishing an EMLMR link coincides with the received information, the control unit 202 may select the EMLMR link identified by the information.

Each of the EMLMR links is assigned an order number from 1 according to this order. More specifically, the EMLMR link having a link order of 1 is the EMLMR link to be selected based on the predetermined criteria. For example, when selecting an EMLMR link in order of reception of the frame including the EMLMR Support sub field having a value of 1, when the AP MLD receives the frame including the EMLMR Support sub field having a value of 1 via Link1 and then receives the frame via Link2, Link1 is assigned an order number of 1. Therefore, in this case, the control unit 202 will select Link1. As described below in other exemplary embodiments, when selecting a plurality of the EMLMR links, the control unit 202 will select an EMLMR link in ascending order of the assigned order number up to a predetermined value that enables the EMLMR link establishment.

When selecting an EMLMR link based on the communication performance, the control unit 202 measures the congestion levels of the channels corresponding to different EMLMR links and then selects the EMLMR link having the lowest congestion level as one of the EMLMR links to be selected. Possible methods for measuring the congestion level include a method based on the number of STAs connected to the AP and a method for obtaining the channel occupancy in each link in the Multi-Link.

In step S4, the control unit 202 selects one EMLMR link. In step S5, the control unit 202 transmits a starting frame for starting the frame exchange sequence via the selected EMLMR link. In step S6, the control unit 202 determines whether, during the time period since the start of the starting frame transmission till the first frame transmission, via the EMLMR link, following the reception of a response frame, another starting frame is received via another EMLMR link different from the selected EMLMR link. The response frame of the EMLMR link is a frame transmitted as a response to the starting frame from the communication apparatus that has received the starting frame in the frame exchange sequence defined in IEEE 802.11 standard Annex G. Examples of response frames include a Clear To Send (CTS) frame.

When the result of the determination in step S6 is NO, i.e., when the control unit 202 does not detect that another starting frame is received via another EMLMR link different from the selected EMLMR link, the processing proceeds to step S10. In step S10, the control unit 202 determines whether the response frame to the starting frame is received. When the response frame is not received, the processing proceeds to step S13. When the response frame is received, the processing proceeds to step S11. Step S11 will be described below.

When the result of the determination in step S6 is YES, i.e., when the control unit 202 detects that another starting frame is received via another EMLMR link different from the selected EMLMR link, the control unit 202 selects one EMLMR link from among the EMLMR links that have transmitted or received the starting frame. The predetermined criteria are similar to those in step S4 and redundant descriptions thereof will be omitted. In step S8, the control unit 202 determines whether the selected link is the link that has received the starting frame. When the result of the determination in step S8 is YES, the processing proceeds to step S9. In step S9, the control unit 202 transmits a response frame. Then, in step S11, the control unit 202 enables the selected link to perform the EMLMR operation. More specifically, the selected link is the link intended by the partner communication apparatus to perform the EMLMR operation, and enables the EMLMR operation according to the demand of the partner communication apparatus.

When the result of the determination in step S8 is NO, the processing proceeds to step S10. In step S10, the control unit 202 determines whether the response frame to the starting frame is received. More specifically, the selected link is the link intended by the communication apparatus (performing the processing in FIGS. 6A and 6B) to perform the EMLMR operation. Even in a case where another EMLMR link receives the starting frame, the control unit 202 will control the EMLMR link not to perform the EMLMR operation.

In step S11, the control unit 202 starts the frame exchange based on the number of spatial streams of which the maximum value is presented in the EMLMR SUPPORTED MCS AND NSS SET sub field of the Common Info field of the Basic variant Multi-Link element transmitted by the non-AP MLD before this flowchart is started. Accordingly, the selected EMLMR link will perform the EMLMR operation. In step S12, the control unit 202 determines whether the frame exchange sequence is completed, and continues the frame exchange sequence until the sequence is completed. When the frame exchange sequence is completed, the processing proceeds to step S13.

A first exemplary embodiment has been described above centering on a method for suitably controlling the EMLMR operation when a communication apparatus exchanges a plurality of starting frames with the partner communication apparatus before starting the EMLMR operation. A specific method for suitably controlling the EMLMR operation refers to a method for selecting an EMLMR link based on the predetermined criteria and enabling the selected EMLMR link to perform the EMLMR operation. More specifically, this method continues the frame exchange sequence via the selected EMLMR link and temporarily stops the frame exchange sequence via deselected EMLMR links.

[Other Exemplary Embodiments]

The first exemplary embodiment has been disclosed centering on a method for selecting one EMLMR link, the control unit 202 may enable a plurality of the EMLMR links to operate in the EMLMR mode. For example, assume a case where four different links (Link1 to Link4) are established between the communication apparatus and the partner communication apparatus. When enabling Link1 and Link2 to operate as the EMLMR links, the control unit 202 performs a method for assigning the spatial stream of Link3 to Link1 and assigning the spatial stream of Link4 to Link2. This increases the number of spatial streams of Link1 and Link2, and in contrast, decreases the number of spatial streams of Link3 and Link4. Taking such a case into consideration, in a case where there exists a plurality of the EMLMR links that increases the number of spatial streams, the control unit 202 can select a plurality of the EMLMR links based on the predetermined criteria in step S4 in FIG. 6A and step S7 in FIG. 6B.

According to the first exemplary embodiment, when selecting an EMLMR link in order of the EMLMR link establishment, the control unit 202 selects an EMLMR link in ascending order of the order number. However, the control unit 202 may select an EMLMR link in descending order of the order number or firstly select the middle order number.

The first exemplary embodiment has been described above centering on an example based on two different methods: a method for continuing the frame exchange sequence via the EMLMR link that has received the starting frame, and a method for continuing the frame exchange sequence via the EMLMR link that has transmitted the starting frame. However, other possible methods include a method for continuing the frame exchange sequence only via the EMLMR link that has received the starting frame, and a method for continuing the frame exchange sequence only via the EMLMR link that has transmitted the starting frame. In the former case, the control unit 202 does not perform the processing in steps S7 and S8. When the result of the determination in step S6 is YES, the control unit 202 continues the frame exchange sequence via the EMLMR link that has received the starting frame. In the latter case, the control unit 202 does not perform the processing in steps S7 and S8. Even when the result of the determination in step S6 is YES, the control unit 202 determines whether a response frame is received in step S10 and then continues the frame exchange sequence via the EMLMR link that has transmitted the starting frame.

Although the first exemplary embodiment has been disclosed centering on a method for selecting an EMLMR link based on predetermined criteria and enabling the selected EMLMR link to perform the EMLMR operation. However, in a case where the communication apparatus exchanges a plurality of starting frames with the partner communication apparatus before starting the EMLMR operation, the control unit 202 may stop the frame exchange sequence via all of the EMLMR links. In this case, the control unit 202 needs to perform the processing again from the step for transmitting or receiving the starting frame. More specifically, when the result of the determination in step S6 is YES, the processing proceeds to step S13. This makes it possible to cancel the EMLMR operation and then enable any EMLMR link to perform the EMLMR operation with predicted suitable procedures.

The first exemplary embodiment has been disclosed centering on a method for selecting an EMLMR link based on predetermined criteria and enabling the selected EMLMR link to perform the EMLMR operation. However, in a case where the communication apparatus exchanges a plurality of starting frames with the partner communication apparatus before starting the EMLMR operation, the control unit 202 may perform the frame exchange based on the number of spatial streams according to the spatial stream capability for each link. In this case, the control unit 202 does not perform the processing in steps S7 and S8. When the result of the determination in step S6 is YES, the control unit 202 receives or transmits a response frame and then performs the processing in step S11. As a result, the determination is made based on the value of the Supported EHT-MCS And NSS Set field (or the Basic EHT-MCS And NSS Set field). Therefore, data communication is performed based on the number of spatial streams assigned to each link since the EMLMR operation does not cause an increase in the predicted number of spatial streams. This field is included in the known EHT Capabilities element (or EHT Operation element).

Although the first exemplary embodiment has been described above based on the Basic variant Multi-Link element, the Basic Multi-Link element is also applicable. The EMLMR Supported MCS And NSS Set sub field may be replaced with the EMLMR Rx NSS sub field or the EMLMR Tx NSS sub field. In this case, the EMLMR Rx NSS sub field indicates the maximum number of spatial streams in reception, and the EMLMR Tx NSS sub field indicates the maximum number of spatial streams in transmission.

A recording medium storing the program code of software for implementing the above-described functions may be supplied to a system or an apparatus, and the computer (CPU or MPU) of the system or the apparatus may read and execute the program code stored in the recording medium. In this case, the program code itself read from the storage medium implements the functions of the above-described exemplary embodiments, and the storage medium storing the program code configures the above-described apparatus.

Examples of storage media for supplying program codes include a flexible disk, hard disk, optical disk, magneto-optical (MO) disk, compact disc read only memory (CD-ROM), compact disc recordable (CD-R), magnetic tape, nonvolatile memory card, ROM, and digital versatile disc (DVD).

The above-described functions may be implemented not only when the computer executes the read program code but also when the operating system (OS) operating on the computer executes part or whole of the actual processing based on instructions of the program code. OS is an abbreviation for Operating System.

Further, the program code read from the storage medium is written to the memory included in a function expansion board inserted into the computer or a function expansion unit connected to the computer. The CPU included in the function expansion board or the function expansion unit may implement the above-described functions by executing part or whole of the actual processing based on instructions of the program code.

The present invention can also be achieved when a program for implementing at least one of the functions according to the above-described exemplary embodiments is supplied to a system or apparatus via a network or storage medium, and at least one processor in the computer of the system or apparatus reads and executes the program. Further, the present invention can also be achieved by a circuit such as an application specific integrated circuit (ASIC) for implementing at least one function.

The present invention is not limited to the above embodiments and various changes and modifications can be made within the spirit and scope of the present invention. Therefore, to apprise the public of the scope of the present invention, the following claims are made.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention makes it possible to suitably control operations in the enhanced multi-link multi-radio (EMLMR) mode in a case where a communication apparatus exchanges a plurality of starting frames with a partner communication apparatus before starting an EMLMR operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus operating as a Multi-Link Device conforming to an Institute of Electrical and Electronics Engineers (IEEE) 802.11 series standard, the communication apparatus comprising:

at least one memory storing a program; and at least one processor that, upon execution of the stored program, is configured to operate as:

a detection unit configured to, during a time period since transmission of a first starting frame to start a frame exchange sequence via a first enhanced multi-link multi-radio (EMLMR) link to another communication apparatus till start of a next frame transmission upon reception of a response frame to the first starting frame, detect reception of a second starting frame to start a frame exchange sequence via a second EMLMR link different from the first EMLMR link from the another communication apparatus; and a control unit configured to, in a case where the detection unit detects the reception of the second starting frame during the time period, perform control to continue the frame exchange sequence via the first EMLMR link or the second EMLMR link, wherein, in a case of performing control to continue the frame exchange sequence via the first EMLMR link, the control unit performs control so that the communication apparatus operating as a non-AP MLD or the another communication apparatus continues the frame exchange sequence based on the number of spatial streams of which the maximum value is defined in an EMLMR SUPPORTED Modulation and Coding Scheme (MCS) AND number of spatial streams (NSS) SET sub field.

2. The communication apparatus according to claim 1, wherein the control unit performs control to continue the frame exchange sequence via the first EMLMR link or the second EMLMR link based on a link identifier (ID) assigned to each link in Multi-Link communication.

3. The communication apparatus according to claim 1, wherein the control unit performs control to continue the frame exchange sequence via the first EMLMR link or the second EMLMR link based on an order of EMLMR link establishment via each link in Multi-Link communication.

4. The communication apparatus according to claim 1, wherein the control unit performs control to continue the frame exchange sequence via the first EMLMR link or the second EMLMR link based on a communication performance of each link in Multi-Link communication.

5. The communication apparatus according to claim 1, wherein, in a case of performing control to start the frame exchange sequence via the second EMLMR link, the control unit performs control so that the communication apparatus operating as a non-AP MLD or the another communication apparatus continues the frame exchange sequence based on the number of spatial streams of which the maximum value is defined in an EMLMR SUPPORTED Modulation and Coding Scheme (MCS) AND number of spatial streams (NSS) SET sub field after the response frame is transmitted via the second EMLMR link.

6. The communication apparatus according to claim 1, wherein, upon completion of the frame exchange sequence, the control unit deletes the EMLMR link that has performed the frame exchange sequence.

7. A method for controlling a communication apparatus operating as a Multi-Link Device conforming to an IEEE 802.11 series standard, the method comprising:

detecting, during a time period since transmission of a first starting frame to start a frame exchange sequence via a first enhanced multi-link multi-radio (EMLMR) link to another communication apparatus till start of a next frame transmission upon reception of a response frame to the first starting frame, reception of a second starting frame to start a frame exchange sequence via a second EMLMR link different from the first EMLMR link from the another communication apparatus; and performing, in a case where the reception of the second starting frame is detected in the detection during the time period, control to continue the frame exchange sequence via the first EMLMR link or the second EMLMR link, wherein, in a case of performing control to continue the frame exchange sequence via the first EMLMR link, performing control so that the communication apparatus operating as a non-AP MLD or the another communication apparatus continues the frame exchange sequence based on the number of spatial streams of which the maximum value is defined in an EMLMR SUPPORTED Modulation and Coding Scheme (MCS) AND number of spatial streams (NSS) SET sub field.

8. A non-transitory computer readable storage medium storing a program for causing a communication apparatus operating as a Multi-Link Device conforming to an IEEE 802.11 series standard to perform a process, the process comprising:

detecting, during a time period since transmission of a first starting frame to start a frame exchange sequence via a first enhanced multi-link multi-radio (EMLMR) link to another communication apparatus till start of a next frame transmission upon reception of a response frame to the first starting frame, reception of a second starting frame to start a frame exchange sequence via a second EMLMR link different from the first EMLMR link from the another communication apparatus; and performing control, in a case where the detecting detects the reception of the second starting frame during the time period, to continue the frame exchange sequence via the first EMLMR link or the second EMLMR link, wherein, in a case of performing control to continue the frame exchange sequence via the first EMLMR link, performing control so that the communication apparatus operating as a non-AP MLD or the another communication apparatus continues the frame exchange sequence based on the number of spatial streams of which the maximum value is defined in an EMLMR SUPPORTED Modulation and Coding Scheme (MCS) AND number of spatial streams (NSS) SET sub field.

* * * * *